United States Patent
Tarassov

(10) Patent No.: US 9,135,002 B1
(45) Date of Patent: Sep. 15, 2015

(54) SYSTEMS AND METHODS FOR RECOVERING AN APPLICATION ON A COMPUTING DEVICE

(75) Inventor: Andrei Tarassov, Hornsby (AU)

(73) Assignee: Symantec Corporation, Mountain View, CA (US)

( * ) Notice: Subject to any disclaimer, the term of this patent is extended or adjusted under 35 U.S.C. 154(b) by 1350 days.

(21) Appl. No.: 12/399,114

(22) Filed: Mar. 6, 2009

(51) Int. Cl.
*G06F 3/00* (2006.01)
*G06F 9/00* (2006.01)
*G06F 9/54* (2006.01)

(52) U.S. Cl.
CPC ...... *G06F 9/00* (2013.01); *G06F 9/54* (2013.01)

(58) Field of Classification Search
None
See application file for complete search history.

(56) References Cited

U.S. PATENT DOCUMENTS

| 5,247,675 | A * | 9/1993 | Farrell et al. | 718/103 |
| 2002/0145613 | A1* | 10/2002 | MacInnis et al. | 345/603 |
| 2004/0205717 | A1* | 10/2004 | Chiang et al. | 717/124 |
| 2006/0101401 | A1* | 5/2006 | Brumme et al. | 717/124 |
| 2008/0005281 | A1* | 1/2008 | Hsueh et al. | 709/219 |
| 2008/0295105 | A1* | 11/2008 | Ozer et al. | 718/103 |

* cited by examiner

*Primary Examiner* — Sisley Kim
(74) *Attorney, Agent, or Firm* — Holland & Hart, LLP

(57) ABSTRACT

A computer-implemented method for recovering an application is described. A priority level is assigned to a process that interacts with the application. A state of the application is monitored. A determination is made that the state of the application is unstable. A first process that is assigned a first priority level is disabled. A determination is made as to whether the state of the application remains unstable.

16 Claims, 8 Drawing Sheets

SYSTEMS AND METHODS FOR RECOVERING AN APPLICATION ON A COMPUTING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors.

One or more computer systems may be managed by a server. In some instances, a host computer software program may run on the computer system and provide the interaction between the server and the computer system. The host program may also interact with additional processes that are external to the computer system or that are executed on the computer system. For example, a host computer software program may interact with a plug-in process. A plug-in process may provide a certain function to the host program on demand. In some instances, the host software program provides services which the plug-in process can use. For example, the host program may provide a way for plug-ins to register themselves with the host program as well as a protocol for the exchange of data with the plug-ins.

Plug-ins and other components interacting with the host computer software program depend on the services provided by the host program. Open application programming interfaces (APIs) typically provide a standard interface, allowing third parties to create plug-ins that interact with the host program. However, third parties may create malicious plug-ins and other components that impede the performance of the host computer software program. In particular, these additional processes (such as plug-ins and external processes) may cause the host computer software program to crash or malfunction. As such, benefits may be realized by providing improved systems and methods for recovering a host computer program running on a computer system that interacts with a server managing the computer system.

SUMMARY

A computer-implemented method for recovering an application is described. A priority level is assigned to one or more processes that interact with the application. A state of the application is monitored. A determination is made as to whether the state of the application is unstable. A first process that is assigned a first priority level is disabled. A determination is made as to whether the state of the application remains unstable.

In one embodiment, a second process that interacts with the application may be disabled if the state of the application remains unstable. The second process may be assigned a second priority level. In one configuration, the second priority level is less than the first priority level. In one embodiment, processes that interact with the application may be continued to be disabled if the state of the application remains unstable. Each of the processes may be assigned a priority level.

In one example, the unstable state of the application may be reported to a server. The server may manage the computing device via the application. In one embodiment, the method described herein may be implemented by a management agent application. In another embodiment, the method described herein may be implemented by a secondary process that is separate and distinct from the application.

In one embodiment, the process is a plug-in application loaded onto the computing device by the application. In another embodiment, the process may be an external process that interacts with the application via application programming interfaces (APIs) of the application.

In one configuration, processes may be assigned to a category if the processes are assigned identical priority levels. A category in a priority level may be randomly selected and the process assigned to the selected category may be disabled if it is determined that the state of the application is unstable. In addition, another category in the priority level may be selected and the process assigned to the other category may be disabled if it is determined that the state of the application remains unstable.

A computer system configured to recover an application running on the computer system is also described. The computer system may include a processor and memory in electronic communication with the processor. The system may also include the application. The application may be configured to interact with one or more processes. The one or more processes may be assigned a priority level. The computer system may also include a monitoring module configured to determine when the state of the application is unstable. Further, the computer system may include a process termination module configured to disable a first process that is assigned a first priority level. In addition, the monitoring module may be further configured to determine whether the state of the application remains unstable.

A computer-program product for recovering an application is also described. The computer-program product comprises a computer-readable medium having instructions thereon. The instructions comprise code programmed to assign a priority level to one or more processes that interact with the application. The instructions may also comprise code programmed to monitor a state of the application, and code programmed to determine whether the state of the application is unstable. The instructions may further comprise code programmed to disable a first process that is assigned a first priority level, and code programmed to determine whether the state of the application remains unstable.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION OF EXEMPLARY EMBODIMENTS

In one embodiment, a management agent running on a client device is an application that may allow the management of the client by a server. For example, the agent may communicate with a server and allow processes to be loaded on the client that provide additional functionalities for the client. In some embodiments, the processes are loaded by the management agent onto the client and the management agent may be constantly running on the client.

In one embodiment, a server may manage a large quantity of clients. Processes loaded by the management agent onto the client may be developed by third party vendors (or the designers of the management agent). Some processes loaded by the agent may have errors, which may prevent the management agent from functioning properly. For example, under some circumstances, a process may cause the management agent to crash or the process may use the application programming interfaces (APIs) of the agent incorrectly, which may cause resource leaks or dead-locks. In these circumstances, the management agent may cease to run on the client and may not be capable to interact and communicate with the server in order to receive tasks and various configurations for the client.

In one configuration, a fix may exist, however, when the agent is not functioning properly. Delivering the fix from the server may require manual intervention, which in the case of numerous clients managed by the server, may be a large burden for a system administrator. In one embodiment, the processes loaded by the management agent reside in the same address space as the agent, so that if an error exists in a single process, the management agent and all the other processes on the client may cease to function properly. As such, the improved systems and methods described herein recover a management agent that may have ceased to function properly due to errors in a process loaded by the agent onto a client computing device.

Figure 1:
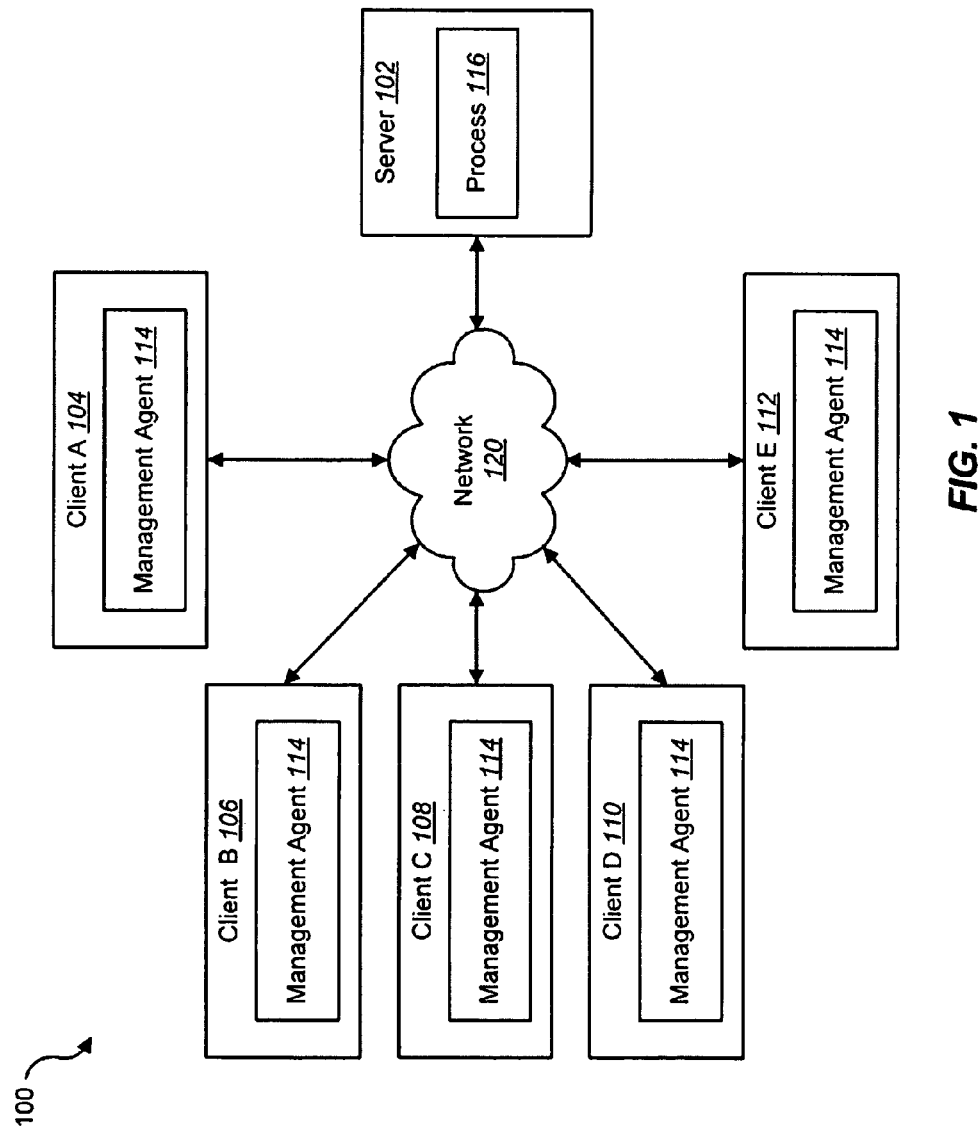
FIG. 1 is a block diagram illustrating one embodiment of a client/server environment that may implement the present systems and methods described herein.

FIG. 1 is a block diagram illustrating one embodiment of a client/server environment 100 that may implement the present systems and methods described herein. In one example, a server 102 may manage one or more client devices 104, 106, 108, 110, 112. The server 102 may communicate with the clients 104, 106, 108, 110, 112 over a network 120. In one embodiment, the clients 104, 106, 108, 110, 112 may be any type of computing device, such as a personal computer (PC), a laptop, a workstation, a personal digital assistant (PDA), a handheld computing device, etc.

In one example, a management agent 114 may be running on each client 104, 106, 108, 110, 112. The agent 114 may facilitate the management of the clients by the server 102. In one embodiment, the server 102 may transmit a process 116 to the clients 104, 106, 108, 110, 112 over the network connection 120. In one embodiment, the management agent 114 loads the process 116 onto the respective client 104, 106, 108, 110, 112. The process 116 may be a plug-in application or any other type of process that is loaded by the management agent 114 and provides a functionality to the clients 104, 106, 108, 110, 112. In one example, the plug-in application may interact with a host software program running on a client 104, 106, 108, 110, 112. In another embodiment, the plug-in application may be a dynamically loadable object (e.g., a shared library, a dynamically linked library (DLL), etc.) that may be executed in the context of the host software program.

Figure 2:
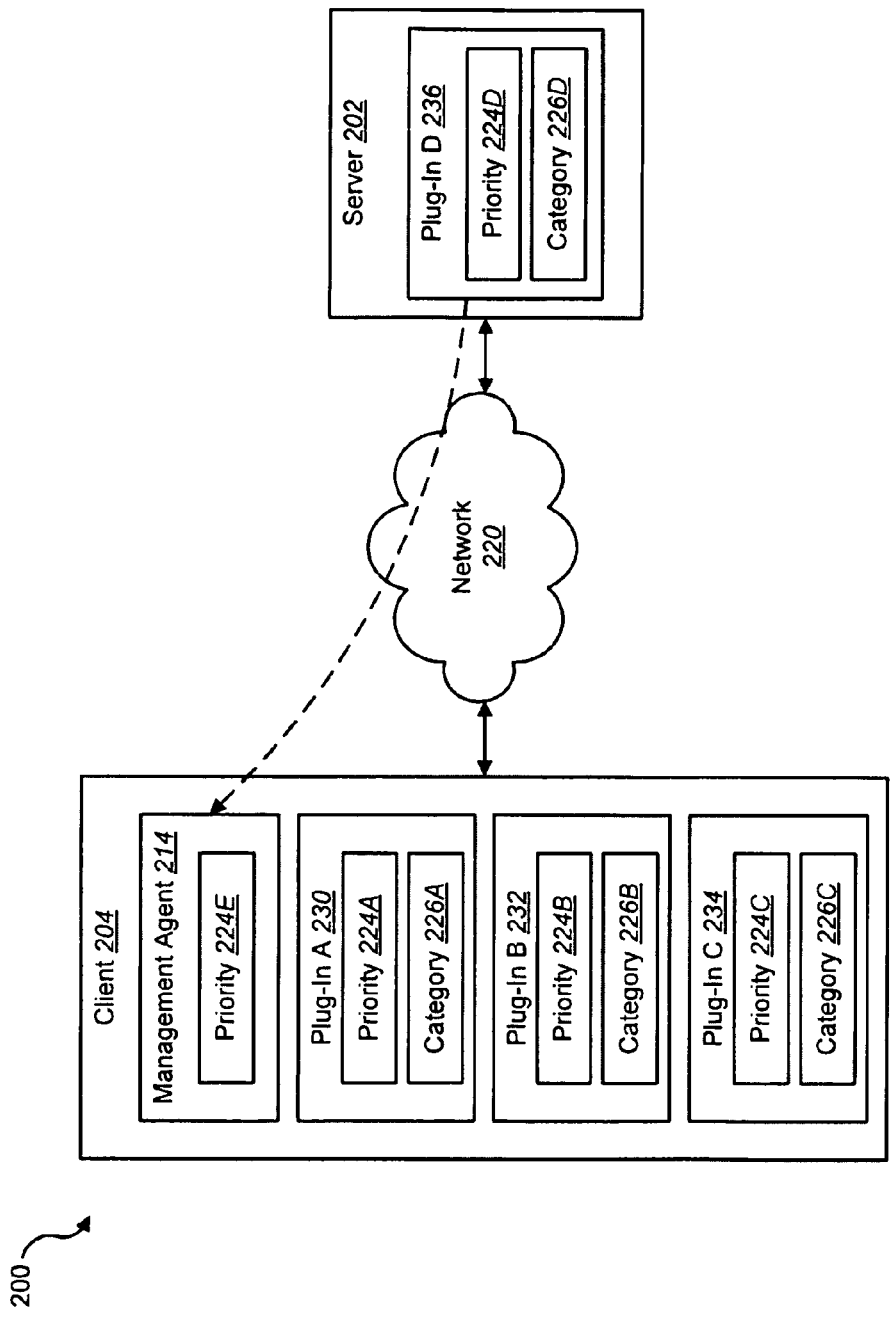
FIG. 2 is a block diagram illustrating another embodiment of a client/server environment in which the present systems and methods may be implemented.

FIG. 2 is a block diagram illustrating another embodiment of a client/server environment 200 in which the present systems and methods may be implemented. In one embodiment, a server 202 manages a client 204 over a network 220. A management agent 214 may be running on the client 204 that allows the client 204 to be managed by the server 202. For example, the server 202 may transmit a process (such as a plug-in) to the management agent 214. The management agent 214 may then load the process onto the client 204. In one embodiment, the loaded process may be executed on the client 204 by using the application programming interfaces (APIs) of the management agent 214. As illustrated in FIG. 2, the management agent 214 receives plug-in D 236 from the server 202. The management agent 214 may have previously loaded other plug-ins onto the client 204, such as plug-in A 230, plug-in B 232, and plug-in C 234.

In one embodiment, the management agent 214 and each of the plug-ins 230, 232, 234, 236 may be assigned a priority level 224. The priority level between the plug-ins may be different depending on the characteristics of the particular plug-in. For example, the priority level 224A of plug-in A 230 may be greater than the priority level 224C of plug-in C 234. The priority level 224E of the management agent 214 may be greater than the priority level of each of the plug-ins loaded on the client 204. The priority level may be assigned by a developer of the plug-in. In addition, a network administrator of the client/server 200 environment may assign the priority level for each plug-in (or other process) that interacts with the management agent 214.

In another embodiment, a plug-in may also be assigned a particular category with a priority level. For example, plug-in C 234 and plug-in D 236 may be assigned the same priority level. However, plug-in C 234 may be assigned a category 226C that is different than the category 226D assigned to plug-in D 236. As an example, plug-in C 234 may provide monitoring functionalities for the client 204. Plug-in C 234 may be assigned a particular priority level 224 C associated with auxiliary plug-ins. In addition, plug-in D 236 may be an auxiliary plug-in but may not necessarily provide monitoring functionalities for the client 204. In one embodiment, plug-in D may be assigned a category 226D that is not different than the category 226C for monitoring functionalities.

Figure 3:
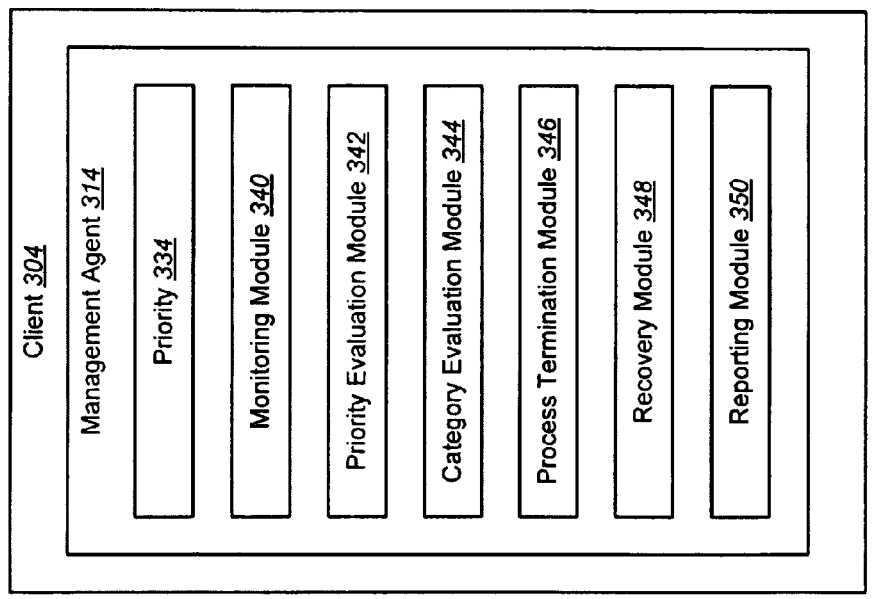
FIG. 3 is a block diagram illustrating one embodiment of certain functionalities of a management agent running on a client.

FIG. 3 is a block diagram illustrating one embodiment of certain functionalities of a management agent 314 running on a client 304. The management agent 314 may be assigned a priority level 334. In one embodiment, the agent 314 may include a monitoring module 340. The monitoring module 340 may monitor the state of the management agent 314. For example, the monitoring module 340 may detect when the state of the management agent 314 is stable or instable.

In one configuration, the agent 314 may also include a priority evaluation module 342, which may evaluate the priority levels of the various processes running on the client 304. In addition, the agent 314 may include a category evaluation module 344, which may evaluation and determine the category (if one exists) of each of the processes running on the client 304.

In one embodiment, the management agent 314 further includes a process termination module 346. The termination module 346 may terminate a particular process or cause the process to stop running on the client 304. The module 346 may decide which process to terminate based on the priority level assigned to each process. In one embodiment, the process termination module 346 may terminate processes with lower priority levels before terminating processes with higher priority levels. The termination module 346 may also terminate a particular process based on the assigned category of the process.

The management agent 314 may also include a recovery module 348. The recovery module 348 may initiate a re-boot (or re-start) of the management agent 314. For example, the termination module 346 may terminate the a process running on the client 304 that may be hindering the functionality of the management agent 314. After the suspected process is terminated, the recovery module 348 may re-boot the management agent 314 in order to regain the functionalities that may have been hindered by the suspected process. A reporting module 350 may report details regarding the suspected process and the steps taken by the recovery module 348 to a server 102 that is managing the client 304. As illustrated in FIG. 3, a single application (i.e., the management agent 314) may monitor its own state for instabilities caused by one or more processes running on the client 304. This single application may also perform the recovery steps that may be required to regain any functionalities that may have been lost due to one or more processes running on the client 304.

Figure 4:
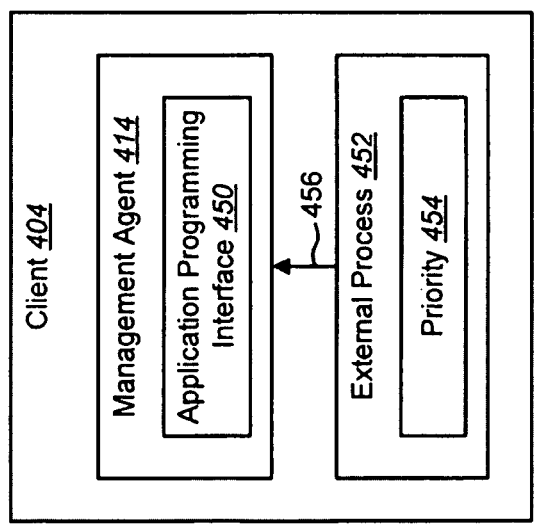
FIG. 4 is a block diagram illustrating a further embodiment of a management agent in communication with an external process.

FIG. 4 is a block diagram illustrating a further embodiment of a management agent 414 in communication with an external process. The external process 452 may be assigned a priority level 454 as described above. In one example, the management agent 414 may allow the receipt of out-of-process communication requests 456 from the external process 452. In some instances, the external process 452 may use APIs 450 of the management agent 414 that are designed for out-of-process communications in such a way that the agent 414 crashes or malfunctions. In one embodiment, the external process 452 may be assigned a relatively low priority level 454.

Figure 5:
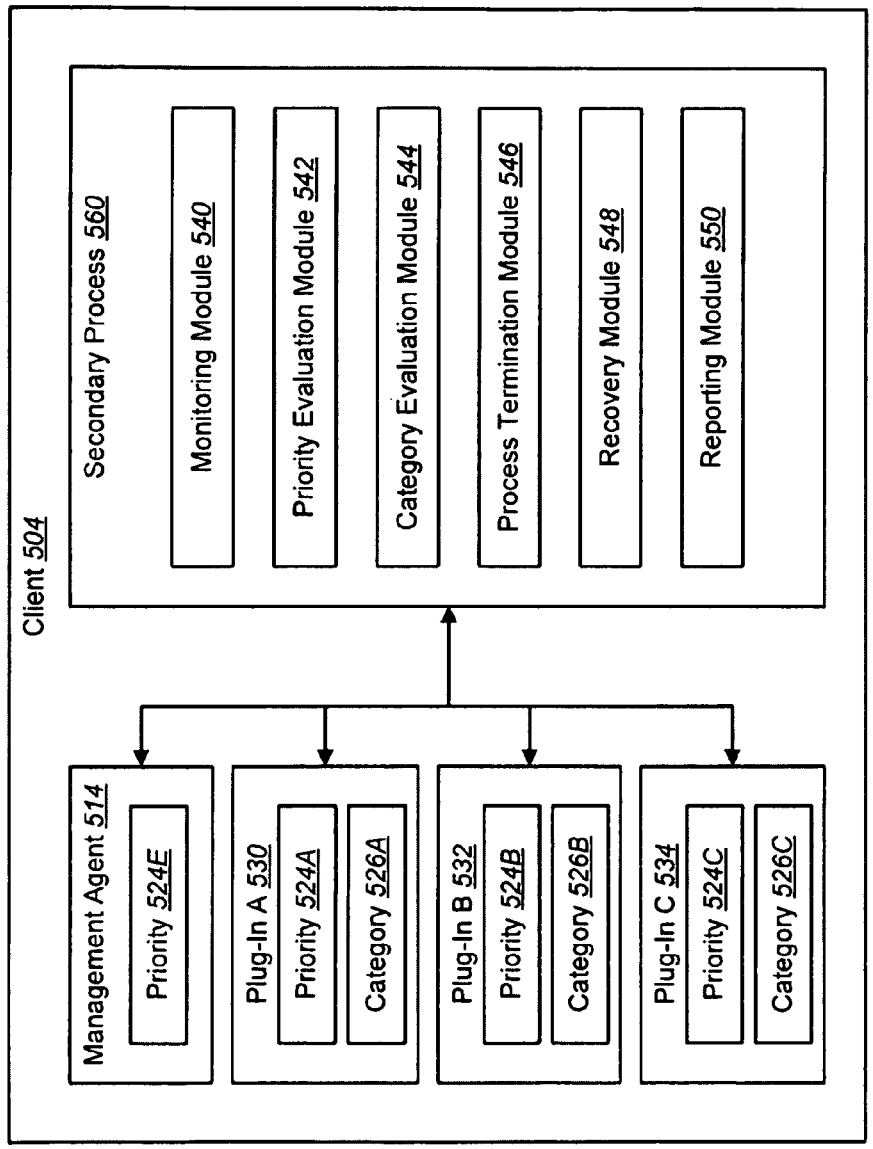
FIG. 5 is a block diagram illustrating one embodiment of a secondary process running on a client that is separate and distinct from the management agent.

FIG. 5 is a block diagram illustrating one embodiment of a secondary process 560 running on a client 504 that is separate and distinct from the management agent 514. As illustrated, the agent 514 may load one or more plug-ins 530, 532, 534 onto the client 504. The agent 514 and each of the plug-ins may be assigned a priority level 524A, 524B, 524C, 524E. In addition, one or all of the plug-ins may be assigned a particular category 526A, 526B, 526C that is associated with the respective priority level.

The secondary process 560 may include a monitoring module 540 that monitors the state of the management agent 514. For example, the monitoring module 540 may monitor for instances when the state of the management agene 514 is unstable (e.g., high usage of a central processing unit (CPU) of the client 504, malfunctions, crashes, hanging, etc.) The secondary process 560 may further include a priority evaluation module 542 that determines the priority level of each process running on the client 504. In one embodiment, the secondary process 560 also includes a category evaluation module 544 to determine which category (if any) has been assigned to a process.

In one embodiment, a process termination module 546 may terminate one or more processes based on the priority level assigned to the process. In addition, a recovery module 548 may perform recovery steps after the one or more processes have been terminated in order to attempt to restore the management agent 514 to a stable state. For example, the recovery module 548 may cause the agent 514 to re-boot. The secondary process 560 may also include a reporting module 550 that may report the unstable state of the agent 514 to a server 102 managing the client 504. The reporting module 550 may also report which process(es) have been (or are planned to be) terminated by the termination module 546.

Figure 6:
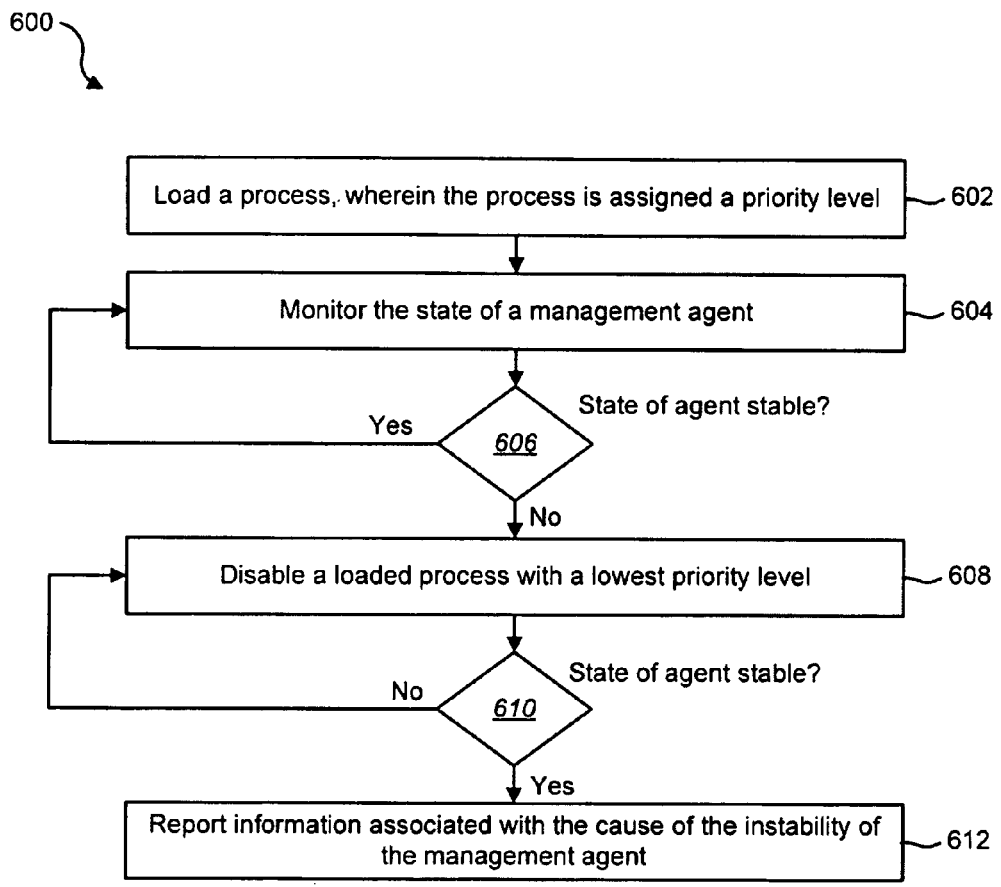
FIG. 6 is a flow diagram illustrating one embodiment of a method for recovering a management agent application on a client computing device.

FIG. 6 is a flow diagram illustrating one embodiment of a method 600 for recovering a management agent application on a client computing device. In one embodiment, the method 600 may be implemented by the management agent 114. In another embodiment, the method 600 may be implemented by a secondary process 560 that is separate and distinct from the management agent 114.

In one embodiment, a process may be loaded 602 onto a client 104. The process may be assigned a priority level. In one configuration, the process is a plug-in application that provides additional functions for the client 104. The management agent 114 may load 602 the process onto the client 102.

In one configuration, the state of the management agent 114 may be monitored 604. In some instances, installed processes running on the client 104 may cause the management agent 114 to crash or malfunction. A first determination 606 may be made as to whether the state of the agent 114 is stable. If it is determined 606 that the agent 114 is stable, the method 600 may return to continue to monitor 604 the state of the agent 114. However, if it is determined 606 that the state of the agent is unstable a process previously loaded on the client 104 may be disabled 608. In one embodiment, a process with a lowest priority level is disabled 608.

In one example, a second determination 610 may be made as to whether the state of the management agent 114 has become stable after the process is disabled 608. If it is determined that the state of the agent 114 is stable, information associated with the cause of the instability of the agent 114 may be reported 612. In one embodiment, the information may be reported 612 to a server 102 managing the client 104. A system administrator may then use the information to repair the client 104, if needed. In one embodiment, information associated with the cause of the instability of the management agent may be reported 612 before a loaded process is disabled 608. The system administrator may then become aware of the instability and take corrective actions to fix the management agent without the need to go through all the steps to discover a faulty process (i.e., a plug-in application).

However, if it is determined 610 that the state of the agent 114 remains unstable, an additional process with the lowest priority level may be disabled. In one embodiment, the additional process may have a priority level that is higher in importance than the previous process that was disabled. For example, the client 104 may have ten (10) processes running. Each of the processes may be assigned a priority level ranging from one (1) to ten (10). A priority level of ten (10) may represent the priority of least importance and one (1) may represent the priority level of the greatest importance. If it is determined, at the first determination 606, that the agent is unstable, the process with the lowest priority level is disabled 608. In this example, the process assigned the priority level of ten (10) may be disabled 608. If it is determined, at the second determination 610, that the agent is still unstable, the process with the next lowest priority level may be disabled 608. In this example, the process assigned the priority level of nine (9) may be disabled 608. The second determination 610 and the disabling 608 may repeat until it is determined 610 that the agent 114 is in a stable state. In one embodiment, a process that was previously disabled may be re-enabled once the agent 114 is in a stable state.

In one embodiment, multiple processes may be assigned to different categories within the same priority level. Using the example above, the agent 114 may be in an unstable state at the first determination 606, and three (3) processes may be running on the client 104 that are each assigned the priority level of ten (10). Each of the three (3) processes may be assigned to a different category, such as A, B, and C. In one embodiment, the method 600 randomly selects one of the categories and disables 608 the process assigned to that category. If the agent 114 is determined to still be unstable at the second determination 610, the method 600 may randomly select a second category in the same priority level and disable 608 the process assigned to that second category. If the agent 114 becomes stable, previously disabled processes assigned to certain categories may be re-enabled. If each process assigned to a different category in the lowest priority level is disabled, and the agent 114 remains in an unstable state, the method 600 continues by disabling 608 the process (or processes) in the next lowest priority level as previously described.

Figure 7:
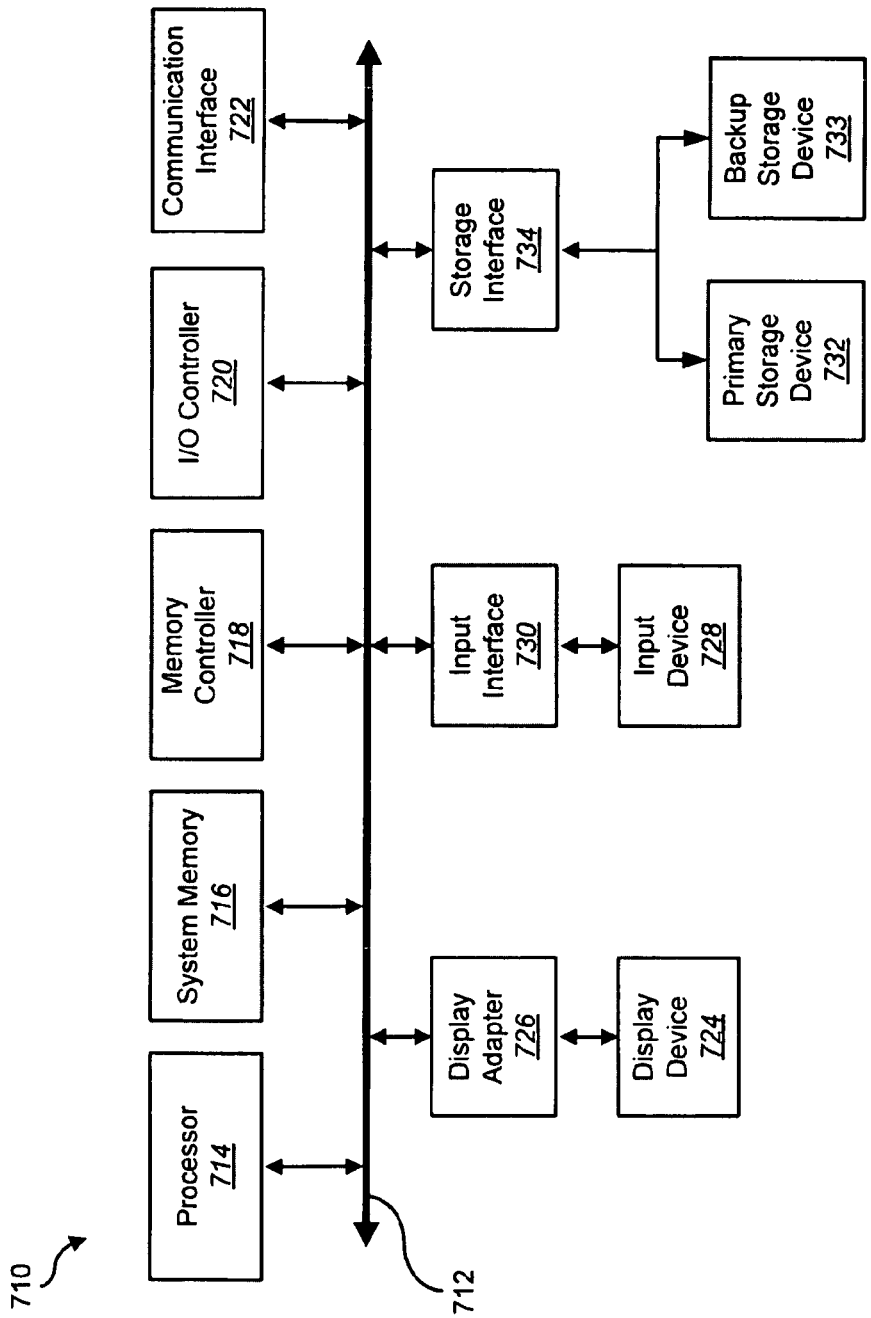
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing the steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
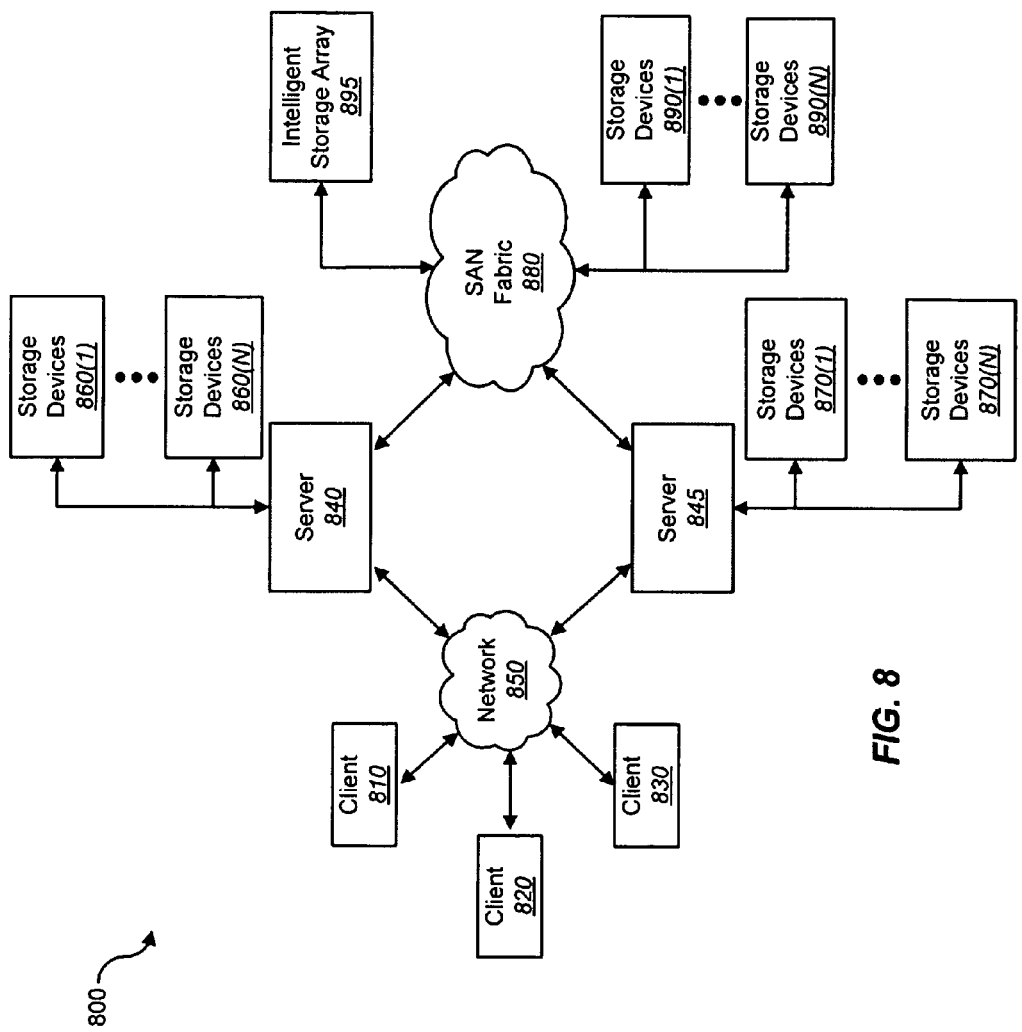
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having", as used in the specification and claims, are interchangeable with and have the same meaning as the word "comprising."

What is claimed is:

1. A computer-implemented method for recovering an application having a plurality of processes, comprising:
    assigning a first priority level to a first process that interacts with the application, wherein the first process is a first plug-in application running on a computing device and loaded onto the computing device by a process loader associated with the application;
    assigning a second priority level to a second process that interacts with the application, wherein the second process is a second plug-in application running on the computing device and loaded onto the computing device by the process loader associated with the application;
    determining if the first process shares the first priority level with at least one additional process;
    upon determining that the first process shares the first priority level with at least one additional process, assigning a category label to the first process;
    monitoring a state of the application;
    determining the state of the application is unstable;
    selecting the first process to disable upon determining that the first priority level assigned to the first process is lower than the second priority level assigned to the second process, wherein the first process is selected based at least in part on randomly selecting the category label assigned to the first process if the first process shares the first priority level with the at least one additional process;
    disabling the first process that is assigned the first priority level;
    upon disabling at least the first process, rebooting the process loader to regain functionalities of at least the first process;
    determining whether the state of the application remains unstable; and
    upon determining the application is returned to a stable state, re-enabling the first process.

2. The method of claim 1, further comprising disabling the second process that interacts with the application if the state of the application remains unstable.

3. The method of claim 2, further comprising continuing to disable processes that interact with the application if the state of the application remains unstable, wherein each of the processes are assigned a priority level.

4. The method of claim 1, further comprising reporting the unstable state of the application to a server, wherein the server manages a computing device via the application.

5. The method of claim 1, wherein the method is implemented by a management agent application.

6. The method of claim 1, wherein the method is implemented by a secondary process that is separate and distinct from the application.

7. The method of claim 1, wherein the first process is an external process that interacts with the application via application programming interfaces (APIs) of the application.

8. The method of claim 1, further comprising randomly selecting another category in the priority level and disabling a process assigned to the other category if it is determined that the state of the application remains unstable.

9. A computer system configured to recover an application having a plurality of processes running on the computer system, comprising:
- a processor;
- memory in electronic communication with the processor; and
- executable instructions stored in the memory, the instructions being executable by the processor to:
  - assign a first priority level to a first process that interacts with the application, wherein the first process is a first plug-in application running on the computer system and loaded onto the computer system by a process loader associated with the application;
  - assign a second priority level to a second process that interacts with the application, wherein the second process is a second plug-in application running on the computer system and loaded onto the computer system by the process loader associated with the application;
  - determine if the first process shares the first priority level with at least one additional process;
  - upon determining that the first process shares the first priority level with at least one additional process, assign a category label to the first process;
  - determine when the state of the application is unstable;
  - select the first process to disable upon determining that the first priority level assigned to the first process is lower than the second priority level assigned to the second process, wherein the first process is selected based at least in part on randomly selecting the category label assigned to the first process if the first process shares the first priority level with the at least one additional process;
  - disable the first process that is assigned the first priority level;
  - upon disabling the first process, reboot the process loader to regain functionalities of at least the first process;
  - determine whether the state of the application remains unstable; and
  - upon determining the application is returned to a stable state, re-enable the first process.

10. The computer system of claim 9, wherein the processor is further configured to disable the second process if the state of the application remains unstable.

11. The computer system of claim 10, wherein the processor is further configured to continue to disable processes that interact with the application if the state of the application remains unstable, wherein each of the processes are assigned a priority level.

12. The computer system of claim 9, wherein the processor is further configured to report the unstable state of the application to a server, wherein the server manages the computer system via the application.

13. The computer system of claim 9, wherein the application comprises a monitoring module, a process termination module, and a reporting module.

14. The computer system of claim 9, further comprising a secondary process that is separate and distinct from the application, wherein the secondary process comprises a monitoring module, a process termination module, and a reporting module.

15. The computer system of claim 9, wherein the first process is an external process that interacts with the application via application programming interfaces (APIs) of the application.

16. A computer-program product for recovering an application having a plurality of processes, the computer-program product comprising a non-transitory computer-readable storage medium having instructions thereon, the instructions being executable by a processor to:
- assign a first priority level to a first process that interacts with the application, wherein the first process is a first plug-in application running on a computing device and loaded onto the computing device by a process loader associated with the application;
- assign a second priority level to a second process that interacts with the application, wherein the second process is a second plug-in application running on the computing device and loaded onto the computing device by the process loader associated with the application;
- determine if the first process shares the first priority level with at least one additional process;
- upon determining that the first process shares the first priority level with at least one additional process, assign a category label to the first process;
- determine when the state of the application is unstable;
- select the first process to disable upon determining that the first priority level assigned to the first process is lower than the second priority level assigned to the second process, wherein the first process is selected based at least in part on randomly selecting the category label assigned to the first process if the first process shares the first priority level with the at least one additional process;
- disable the first process that is assigned the first priority level;
- upon disabling the first process, reboot the process loader to regain functionalities of at least the first process;
- determine whether the state of the application remains unstable; and
- upon determining the application is returned to a stable state, re-enable the first process.

* * * * *